Figure 1:
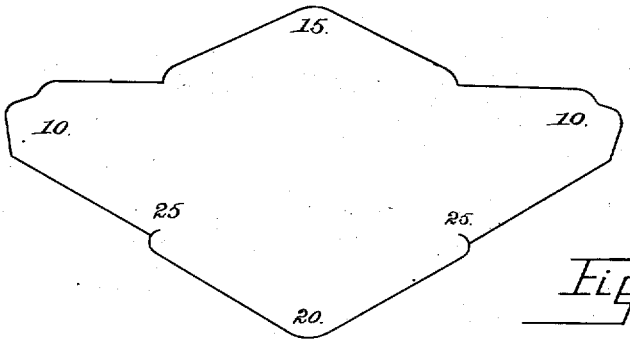

W. J. PUCKETT.

ENVELOPE OPENER.

No. 11,332. Reissued May 9, 1893.

WITNESSES:

C. J. Bocianne.

Chas. E. Dawson

INVENTOR

W. J. Puckett

BY

A. J. O'Brien

ATTORNEY.

UNITED STATES PATENT OFFICE.

WILLIAM J. PUCKETT, OF DENVER, COLORADO, ASSIGNOR TO THE NOVEL ENVELOPE-OPENER COMPANY, OF SAME PLACE.

ENVELOPE-OPENER.

SPECIFICATION forming part of Reissued Letters Patent No. 11,332, dated May 9, 1893.

Original No. 459,461, dated September 15, 1891. Application for reissue filed May 6, 1892. Serial No. 432,100.

*To all whom it may concern:*

Be it known that I, WILLIAM J. PUCKETT, a citizen of the United States, residing at Denver, in the county of Arapahoe and State of Colorado, have invented certain new and useful Improvements in Envelope-Openers; and I do hereby declare the following to be a full, clear, and exact description of the invention, such as will enable others skilled in the art to which it appertains to make and use the same, reference being had to the accompanying drawings, and to the figuers of reference marked thereon, which form a part of this specification.

My invention relates to a novel form and construction of envelope provided with one or more projecting corner pockets or shields and a flexible opener, such as a thread, cord or wire, having its extremities concealed within the envelope. If two pockets or shields are used they should be located at adjacent corners of the envelope and conceal the extremities of the opener the body portion of which lies within the main inclosure.

I am aware that an opener consisting of a thread extending between the adjacent corners of envelopes, otherwise, of ordinary construction, has been heretofore protected by Letters Patent; but in these patents the opener protrudes from the envelope corner or corners, and is thus exposed so that it may be grasped; or it is entirely concealed within the main inclosure of the envelope. These exposed extremities of the opener are very objectionable, and are, in fact, believed to be impracticable for several obvious reasons. For instance, the exposed opener may accidentally catch upon some object while being handled in the post offices, when a sudden pull will tear open the envelope and completely destroy its usefulness. On the other hand, when the thread ends are concealed within the main inclosure the contents of the envelope are liable to be torn in opening. My invention is designed and believed to overcome this difficulty inasmuch as the extremities of the opener are concealed by the use of one or more auxiliary corner pockets or shields in which the extremity or extremities of the opener are located whereby one or either of the opener ends may be grasped while in the shield or pockets and pulled outward by tearing off its protection, thus opening the envelope quickly, easily and neatly without injuring the inclosure or contents thereof, since the part torn off projects beyond the same. This envelope is believed to be practicable and devoid of objectionable features. It will be fully understood by reference to the accompanying drawings in which is illustrated an embodiment of the invention.

Figure 2:
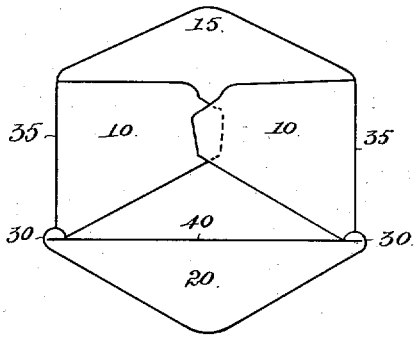
Figure 3:
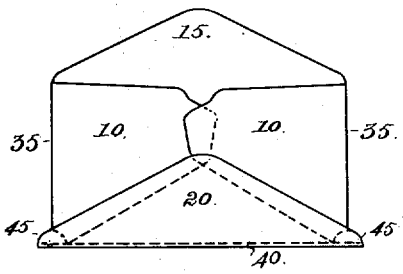
Figure 4:
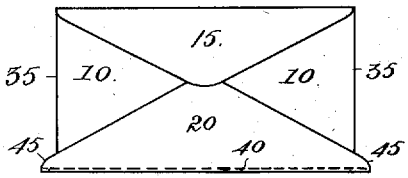

In the drawings Figure 1 shows the blank from which my improved envelope may be formed. Fig. 2 shows the end flaps folded with the opener in place. In Fig. 3 the side flap is folded over the opener, which is shown in dotted lines. Fig. 4 shows my improved envelope sealed.

In the views let the numeral 10 designate the end flap, 15 one of the side flaps, and 20 the other side flap. In forming the blank shown in Fig. 1 notches or slits 25 are cut between the side flap 20 and the end flap so that when the end flaps are placed as shown in Fig. 2, projections 30 are left which extend beyond the end flap folding lines 35. The opener 40 may be placed as shown in Fig. 2 with its extremities engaging parts 30 where they may be secured with a little mucilage or in any other suitable manner. Flap 20 is then folded and sealed as shown in Fig. 3 forming the projecting auxiliary pockets or shields 45 concealing or protecting the extremities of the opener which are preferably plain, but which may be provided with knots giving them a slight enlargement. In opening the envelope either projecting pocket or shield 45 with the inclosed extremity of the opener may be grasped between the thumb and finger. As the pocket or shield is torn off the opener is pulled outward so as to cut the envelope on the folding line. Projections 30 may be sealed so as to form pockets or left open so as to form simply shields. The pockets, however, are believed preferable, and though one or more may be used, two located at adjacent corners are believed preferable, since the symmetry of the envelope is thereby preserved and enhanced. The auxiliary corner pockets will be found useful considered independently of the opening cord, thread or wire since they offer projections for the insertion of a sharp instrument used as an opener without danger of cutting or injuring the contents or inclosure.

Having thus described my invention, what I claim is—

1. A suitable blank provided with slits or notches 25, 25, cut inward from its edge between one flap and the two adjacent flaps and extending from the extremities of the folding-lines of the intermediate flap to intersect the folding lines of the wing flaps, whereby when the last-named flaps are folded corners 30, 30 shall be left projecting beyond the folding lines of said flaps and adapted to form pockets 45 45, extending beyond the main inclosure when the third or intermediate flap is folded, substantially as described.

2. An envelope provided with auxiliary pockets at two adjacent corners, said pockets projecting beyond the main inclosure, in combination with a stout thread, small cord, or wire with its body portion lying within the folding crease between the auxiliary pockets, while its extremities extend beyond the main inclosure into said pockets, where they are concealed and fastened substantially as described.

3. An envelope provided with an auxiliary corner pocket or shield projecting beyond the main inclosure in combination with a flexible opener having its body portion lying within the main inclosure while one of its extremities extends beyond the same into said pocket, or shield, substantially as described.

In testimony whereof I affix my signature in presence of two witnesses.

WILLIAM J. PUCKETT.

Witnesses:

JAMES W. CARY,

JOHN. C. TELLER.